Patented Mar. 2, 1943

2,312,668

UNITED STATES PATENT OFFICE 2,312,668

POWER TRANSMITTING APPARATUS

Ralph L. Newton, Kansas City, Mo.

Application May 20, 1942, Serial No. 443,750

13 Claims. (Cl. 74—415)

This invention relates to power transmitting apparatus of the character particularly adapted for positioning between a driving shaft and a driven shaft, and has for its primary object to provide such equipment capable of increasing the torque imparted to the driving shaft as compared to that of the driven shaft.

One of the salient objects of the instant invention is the provision of apparatus of the aforementioned character having as a part thereof a series of specially formed levers mounted upon the driving shaft, that cooperate in a special manner with a series of arms rigid to the driven shaft, said levers and arms being preferably operably joined by means in the nature of an intermediate shaft carrying a plurality of arms and levers disposed to be engaged by the levers and arms of the driving shaft and driven shaft respectively.

This invention has for a further object to provide power transmitting apparatus including a number of levers, each provided with a concave surface facing the direction of travel of said levers about the axis of a driving shaft, which levers are disposed to engage respectively the ends of a series of arms carried by the driven shaft.

The particular manner in which power is transmitted from the driving shaft to the driven shaft through the medium of intermediate mechanism, including an intermediate shaft, is of importance and the details of constructing power transmitting apparatus embodying this invention incorporates a large number of minor objects that will appear during the course of the following specification, referring to the accompanying drawing wherein:

Fig. 1 is a top plan view of power transmitting apparatus made in accordance with the present invention and establishing connection between a conventional motor driven driving shaft and a driven shaft connected to the work; and Fig. 2 is a vertical sectional view taken on line II—II of Fig. 1.

While the illustrated embodiment of the invention is diagrammatic in character, the equipment shown is capable of efficient operation and of performing the function of transmitting power from driving shaft 4 to driven shaft 6. These shafts are of well-known character in that the former is journalled in bearings 8 mounted on a suitable support 10 and driven by motor 12. The joint 14 between motor 12 and shaft 4 is of conventional type and may include a clutch if desired.

Driven shaft 6 is journalled in bearings 16 mounted on support 10 and connection to the work may be effected through the medium of pulley wheels 18 and belts 20.

A plurality of specially formed levers 22 are rigidly secured to driving shaft 4 and each of said levers has a concave surface 24 facing the direction of travel indicated by the arrow in Fig. 2. Driven shaft 6 is provided with a plurality of arms 26 rigid therewith and extending radially therefrom. Each arm 26 has a roller 28 at the free end thereof.

Intermediate shaft 30 journalled in bearings 32 on support 10, has a series of levers 34 and a plurality of arms 36 rigid therewith and extending radially therefrom. The free ends of arms 36 are each provided with a roller 38 that establishes line contact with the concave surface 24 of the respective levers 22. Each of levers 34 has a concave surface 40 facing the direction of travel of intermediate shaft 30, which direction is indicated by the arrow in Fig. 2.

As illustrated in Fig. 1, the two sets of levers 22 on driving shaft 4 are in the same plane as the two sets of arms 36 on intermediate shaft 30. Thus, as driving shaft 4 is moved about its axis of rotation by motor 12 or any other prime mover of desired character, the free ends of levers 22 engage rollers 38 of arms 36.

The spacing of levers 22 and arms 36 is as shown in Fig. 2 and this spacing must be carefully regarded because it is desirable that but one lever 22 have contact with one arm 36. The point of line contact between a lever 22 and an arm 36 is at an intersecting point on the paths of travel of said arms and levers.

After the contact is made as shown in Fig. 2, the effective length of the lever 22 becomes progressively shorter and the effective length of arm 36 becomes progressively greater during the period of contact. Throughout this period roller 38 on the particular arm 36 rides along the concave surface 24 of lever 22. While this action is occurring, one of levers 34 on intermediate shaft 30, is engaging one of the arms 26 of driven shaft 6. The loss in power transmitted from driving shaft 4 to driven shaft 6 through intermediate shaft 30 is therefore, reduced to an absolute minimum. Obviously, a single step in gear reduction is obtained with the levers and arms on the driving and intermediate shafts respectively, and the latter might therefore also be termed a "driven shaft." A second step in gear reduction is obtained with the levers and 7. In apparatus of the character described having a driving shaft and a driven shaft, means for transmitting power from the former to the latter, comprising a plurality of levers rigid with the driving shaft, each provided with a concave surface facing the direction of travel; a rotatable intermediate shaft; a plurality of radial arms rigid therewith; and means operably interconnecting the intermediate shaft and said driven shaft, said arms of the intermediate shaft having the free ends respectively thereof disposed to be successively engaged by the concave faces of the said levers on the driving shaft as the same is rotated, said means operably interconnecting the intermediate shaft and said driven shaft comprising a series of levers rigid to the intermediate shaft each provided with a concave surface facing the direction of travel, and a series of arms rigid to the driven shaft disposed for successive engagement with the levers of the intermediate shaft, the ends of the arms of said driven shaft having line contact with the concave surface of the levers of the intermediate shaft respectively, the said levers of the intermediate shaft and the said arms of the driven shaft being spaced apart to cause one arm to be in contact with one lever during the working cycle while the remaining levers and arms of the intermediate shaft and the driven shaft respectively are out of engagement, the said arms and the said levers of the intermediate shaft and the driving shaft respectively being spaced to cause one arm thereof to be in contact with one lever thereof during the working cycle throughout the time when one lever of the intermediate shaft is in contact with one arm of the driven shaft.

8. In apparatus of the character described having a driving shaft and a driven shaft, means for transmitting power from the former to the latter, comprising offset series of levers rigid with the driving shaft, the levers of one series being in staggered relation to the levers of the other series; and offset series of radial arms rigid with the driven shaft, the arms of one series being in staggered relation to the arms of the other series, each of said series of levers being in the same plane with a series of arms respectively.

9. In apparatus of the character described having a driving shaft and a driven shaft, means for transmitting power from the former to the latter comprising offset series of levers rigid with the driving shaft, the levers of one series being in staggered relation to the levers of the other series; and offset series of radial arms rigid with the driven shaft, the arms of one series being in staggered relation to the arms of the other series, each of said series of levers being in the same plane with a series of arms respectively, the said levers of one series and the said arms of a corresponding series being spaced apart respectively to cause one arm to be in contact with one lever during the working cycle while the remaining arms and levers of said series are out of engagement.

10. In apparatus of the character described having a driving shaft and a driven shaft, means for transmitting power from the former to the latter, comprising offset series of levers rigid with the driving shaft, each of said levers having a concave surface facing the direction of travel, the levers of one series being staggered with relation to the levers of the other series; and offset series of radial arms rigid with the driven shaft, the arms of one series being staggered with relation to the arms of the other series, said arms having their free ends disposed to be successively engaged by the concave faces of the said levers on the driving shaft as the same is rotated.

11. In apparatus of the character described having a driving shaft and a driven shaft, means for transmitting power from the former to the latter, comprising offset series of levers rigid with the driving shaft, each of said levers having a concave surface facing the direction of travel and terminating in a convex surface at the free end of the lever, the levers of one series being staggered with relation to the levers of the other series; and offset series of radial arms rigid with the driven shaft, the arms of one series being staggered with relation to the arms of the other series, said arms having their free ends disposed to be successively engaged by the convex and concave faces of the said levers on the driving shaft as the same is rotated.

12. In apparatus of the character described having a driving shaft and a driven shaft, means for transmitting power from the former to the latter, comprising offset series of levers rigid with the driving shaft, each of said levers having a concave surface facing the direction of travel and terminating in a convex surface at the free end of the lever, the levers of one series being staggered with relation to the levers of the other series; and offset series of radial arms rigid with the driven shaft, the arms of one series being staggered with relation to the arms of the other series, said arms having their free ends provided with rollers and disposed to be successively engaged by the convex and concave faces of the said levers on the driving shaft as the same is rotated.

13. In apparatus of the character described having a driving shaft and a driven shaft, means for transmitting power from the former to the latter, comprising offset series of levers rigid with the driving shaft, the levers of one series being staggered with relation to the levers of the other series; offset series of radial arms rigid with the driven shaft, the arms of one series being staggered with relation to the arms of the other series; an intermediate shaft; and offset series of levers and offset series of arms rigid with the intermediate shaft for respective contacting engagement with the arms on the driven shaft and with the levers on the driving shaft when the latter is rotated.

RALPH L. NEWTON.

March 2, 1943.  P. W. NIPPERT  2,312,669
VOLTAGE REGULATOR FOR THE ELECTRICAL SYSTEMS OF AUTOMOTIVE VEHICLES
Filed Nov. 9, 1940
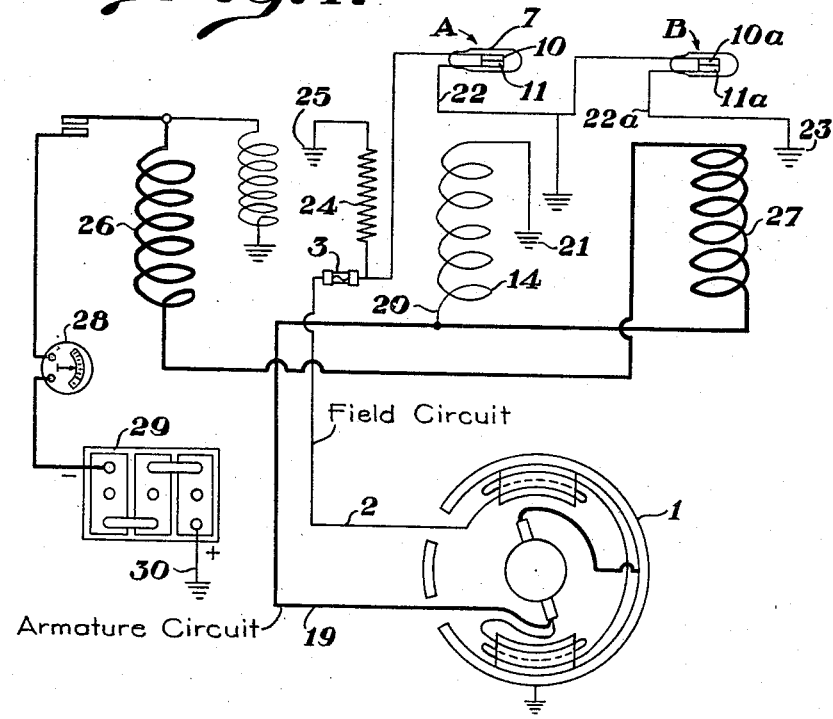
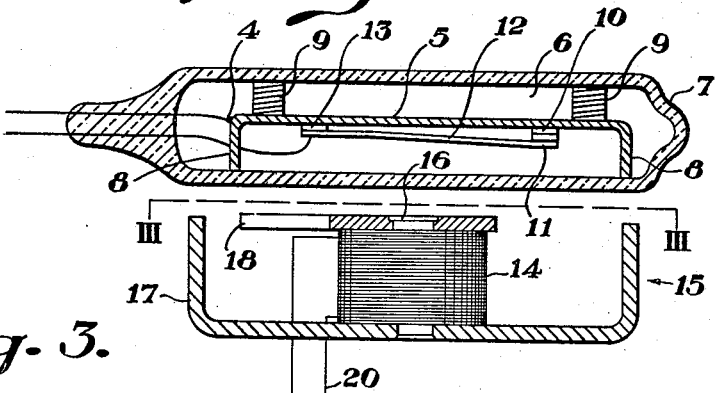
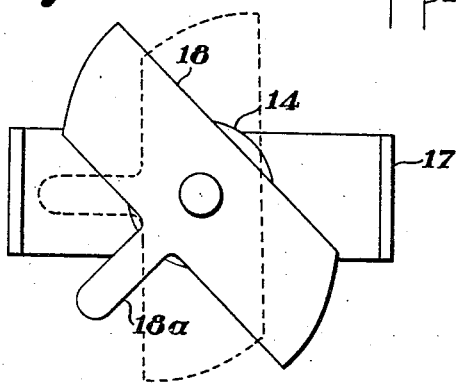
Inventor
Paul W. Nippert
H. S. McDowell
Attorney